(12) United States Patent
Hundley et al.

(10) Patent No.: US 10,994,491 B2
(45) Date of Patent: May 4, 2021

(54) ARCHITECTED MATERIALS FOR ENHANCED ENERGY ABSORPTION

(71) Applicant: HRL LABORATORIES, LLC, Malibu, CA (US)

(72) Inventors: Jacob M. Hundley, Los Angeles, CA (US); Tobias A. Schaedler, Oak Park, CA (US); Sophia S. Yang, Los Angeles, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 13 days.

(21) Appl. No.: 16/425,566

(22) Filed: May 29, 2019

(65) Prior Publication Data

US 2019/0315086 A1    Oct. 17, 2019

Related U.S. Application Data

(62) Division of application No. 15/622,518, filed on Jun. 14, 2017, now Pat. No. 10,427,375, which is a
(Continued)

(51) Int. Cl.
*B29C 33/52* (2006.01)
*B32B 3/12* (2006.01)
(Continued)

(52) U.S. Cl.
CPC .......... *B29C 64/40* (2017.08); *B29C 33/3835* (2013.01); *B29C 33/3842* (2013.01);
(Continued)

(58) Field of Classification Search
None
See application file for complete search history.

(56) References Cited

U.S. PATENT DOCUMENTS

| 5,041,472 A | 8/1991 | Myer |
|---|---|---|
| 5,518,802 A | 5/1996 | Colvin et al. |

(Continued)

FOREIGN PATENT DOCUMENTS

| JP | 2006-0513070 | 4/2006 |
|---|---|---|
| JP | 2009-0143540 | 7/2009 |

OTHER PUBLICATIONS

Ashby et al., "Metal Foams, A Design Guide," Butterworth-Heinemann, 2000, 263 pages.
(Continued)

*Primary Examiner* — Shamim Ahmed
(74) *Attorney, Agent, or Firm* — Lewis Roca Rothgerber Christie, LLP

(57) ABSTRACT

A three-dimensional lattice architecture with a thickness hierarchy includes a first surface and a second surface separated from each other with a distance therebetween defining a thickness of the three-dimensional lattice architecture; a plurality of angled struts extending along a plurality of directions between the first surface and the second surface; a plurality of nodes connecting the plurality of angled struts with one another forming a plurality of unit cells. At least a portion of the plurality of angled struts are internally terminated along the thickness direction of the lattice structure and providing a plurality of internal degrees of freedom towards the first or second surface of the lattice architecture.

8 Claims, 16 Drawing Sheets

Related U.S. Application Data division of application No. 15/151,324, filed on May 10, 2016, now Pat. No. 9,809,002, which is a division of application No. 13/927,064, filed on Jun. 25, 2013, now Pat. No. 9,375,864.

(60) Provisional application No. 61/775,330, filed on Mar. 8, 2013.

(51) Int. Cl.

| | | |
|---|---|---|
| *G03F 1/80* | (2012.01) | |
| *C23F 1/00* | (2006.01) | |
| *B29C 64/40* | (2017.01) | |
| *B29C 33/38* | (2006.01) | |
| *B32B 9/00* | (2006.01) | |
| *B32B 15/04* | (2006.01) | |
| *B32B 27/06* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 3/26* | (2006.01) | |
| *B32B 7/00* | (2019.01) | |
| *B32B 7/02* | (2019.01) | |
| *B32B 7/04* | (2019.01) | |
| *B32B 7/12* | (2006.01) | |
| *B32B 9/04* | (2006.01) | |
| *B32B 15/00* | (2006.01) | |
| *B32B 27/00* | (2006.01) | |
| *B32B 27/28* | (2006.01) | |
| *B32B 3/00* | (2006.01) | |
| *B32B 3/02* | (2006.01) | |
| *B32B 3/14* | (2006.01) | |
| *B32B 3/18* | (2006.01) | |
| *B32B 3/20* | (2006.01) | |
| *B32B 3/28* | (2006.01) | |
| *B32B 3/30* | (2006.01) | |
| *B29C 64/124* | (2017.01) | |
| *B29C 64/135* | (2017.01) | |
| *B29C 64/129* | (2017.01) | |
| *B29C 33/42* | (2006.01) | |
| *B29C 35/08* | (2006.01) | |
| *B33Y 10/00* | (2015.01) | |
| *B33Y 80/00* | (2015.01) | |

(52) U.S. Cl.
CPC .......... *B29C 33/424* (2013.01); *B29C 64/124* (2017.08); *B29C 64/129* (2017.08); *B29C 64/135* (2017.08); *B32B 3/00* (2013.01); *B32B 3/02* (2013.01); *B32B 3/12* (2013.01); *B32B 3/14* (2013.01); *B32B 3/18* (2013.01); *B32B 3/20* (2013.01); *B32B 3/26* (2013.01); *B32B 3/266* (2013.01); *B32B 3/28* (2013.01); *B32B 3/30* (2013.01); *B32B 7/00* (2013.01); *B32B 7/02* (2013.01); *B32B 7/04* (2013.01); *B32B 7/12* (2013.01); *B32B 9/00* (2013.01); *B32B 9/005* (2013.01); *B32B 9/04* (2013.01); *B32B 15/00* (2013.01); *B32B 15/04* (2013.01); *B32B 27/00* (2013.01); *B32B 27/06* (2013.01); *B32B 27/28* (2013.01); *B32B 27/30* (2013.01); *B32B 27/302* (2013.01); *B32B 27/308* (2013.01); *B32B 27/32* (2013.01); *B32B 27/34* (2013.01); *B32B 27/365* (2013.01); *B29C 2035/0827* (2013.01); *B32B 2250/00* (2013.01); *B32B 2250/40* (2013.01); *B32B 2264/00* (2013.01); *B32B 2264/107* (2013.01); *B32B 2307/40* (2013.01); *B32B 2307/558* (2013.01); *B32B 2307/56* (2013.01); *B32B 2307/718* (2013.01); *B32B 2307/728* (2013.01); *B32B 2307/73* (2013.01); *B32B 2307/732* (2013.01); *B32B 2419/00* (2013.01); *B32B 2605/00* (2013.01); *B33Y 10/00* (2014.12); *B33Y 80/00* (2014.12); *Y10T 29/49826* (2015.01); *Y10T 428/24149* (2015.01)

(56) References Cited

U.S. PATENT DOCUMENTS

| | | |
|---|---|---|
| 5,997,795 A | 12/1999 | Danforth et al. |
| 6,730,386 B1 | 5/2004 | Stahlke et al. |
| 7,382,959 B1 | 6/2008 | Jacobsen |
| 7,653,276 B1 | 1/2010 | Gross et al. |
| 7,653,279 B1 | 1/2010 | Jacobsen |
| 7,687,132 B1 | 3/2010 | Gross et al. |
| 8,114,544 B1 | 2/2012 | Salguero et al. |
| 8,197,930 B1 | 6/2012 | Jacobsen et al. |
| 8,309,274 B2 | 11/2012 | Rock et al. |
| 8,320,727 B1 | 11/2012 | Jacobsen et al. |
| 8,353,240 B1 | 1/2013 | Schaedler et al. |
| 8,367,306 B1 | 2/2013 | Doty et al. |
| 8,546,064 B2 * | 10/2013 | Rock .................. H01M 8/0258 430/311 |
| 8,573,289 B1 | 11/2013 | Roper et al. |
| 8,579,018 B1 | 11/2013 | Roper et al. |
| 8,663,539 B1 | 3/2014 | Kolodziejska et al. |
| 9,116,428 B1 | 8/2015 | Jacobsen et al. |
| 9,601,234 B2 * | 3/2017 | King .................... H01B 5/14 |
| 2005/0202206 A1 | 9/2005 | Wadley et al. |
| 2006/0163319 A1 | 7/2006 | Ervin et al. |
| 2008/0006353 A1 | 1/2008 | Elzey et al. |
| 2010/0009728 A1 | 1/2010 | Koshi et al. |
| 2010/0159303 A1 * | 6/2010 | Rock .................... B33Y 10/00 429/507 |
| 2010/0159398 A1 | 6/2010 | Rock et al. |
| 2011/0284110 A1 * | 11/2011 | Gagnon ............ B01L 3/502707 137/597 |
| 2013/0143060 A1 | 6/2013 | Jacobsen et al. |
| 2015/0176132 A1 | 6/2015 | Hundley et al. |

OTHER PUBLICATIONS

Chinese Office Action dated Apr. 1, 2016 for related CN Application No. 201380074364.8 with English Translation (11 pages).
EP Extended European Search Report dated Aug. 19, 2016 for related EP Application No. 13877263.7 (7 pages).
Gibson et al., "Cellular Solids: Structures and Properties," Cambridge University Press, 1988, Chapters 4 and 5, 143 pages.
International Preliminary Report on Patentability for PCT Application No. PCT/US2013/048003, dated Mar. 10, 2015, 7 pages.
International Search Report and Written Opinion for International Application No. PCT/US2013/048003, dated Nov. 27, 2013, 10 pages.

* cited by examiner

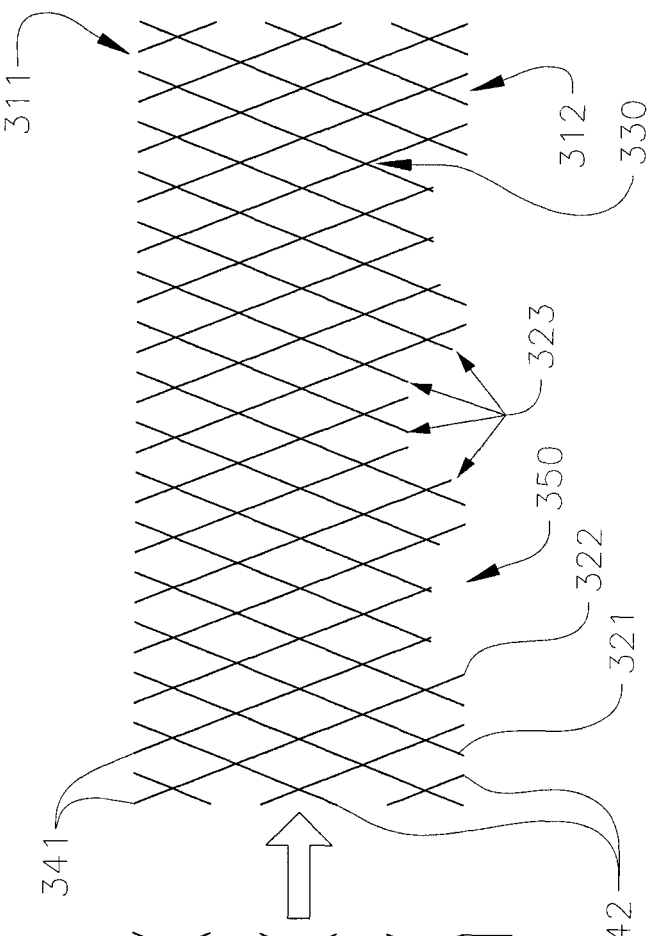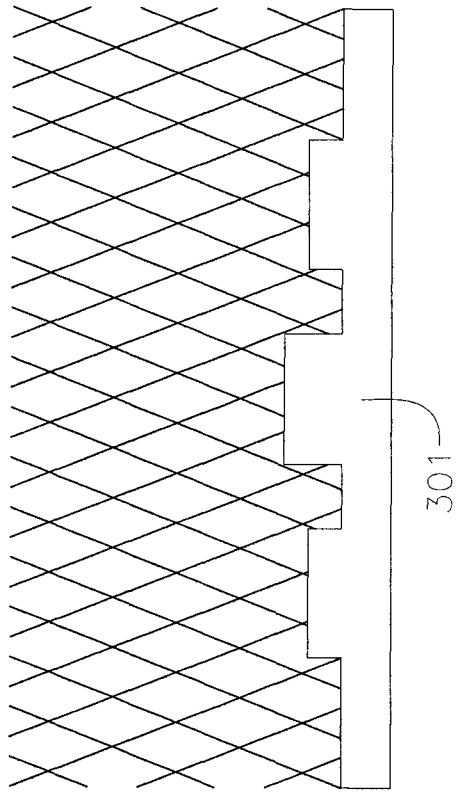

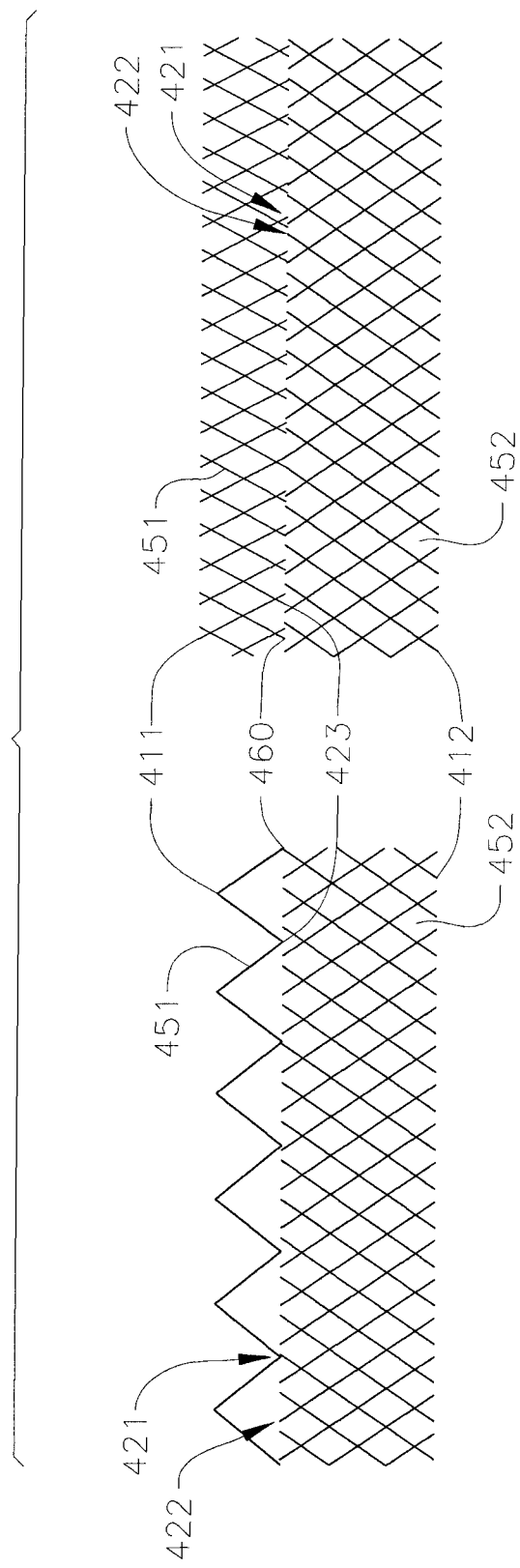

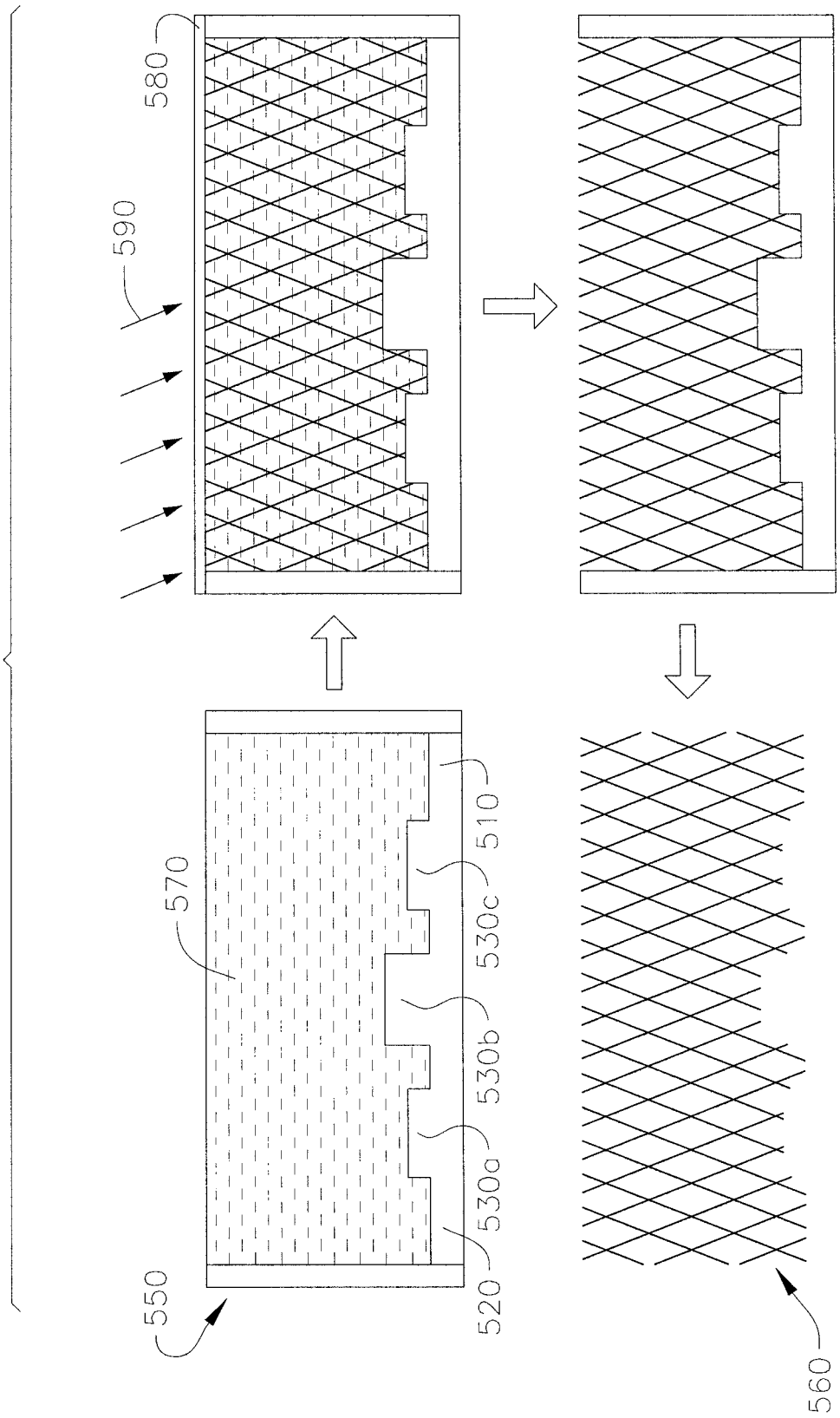

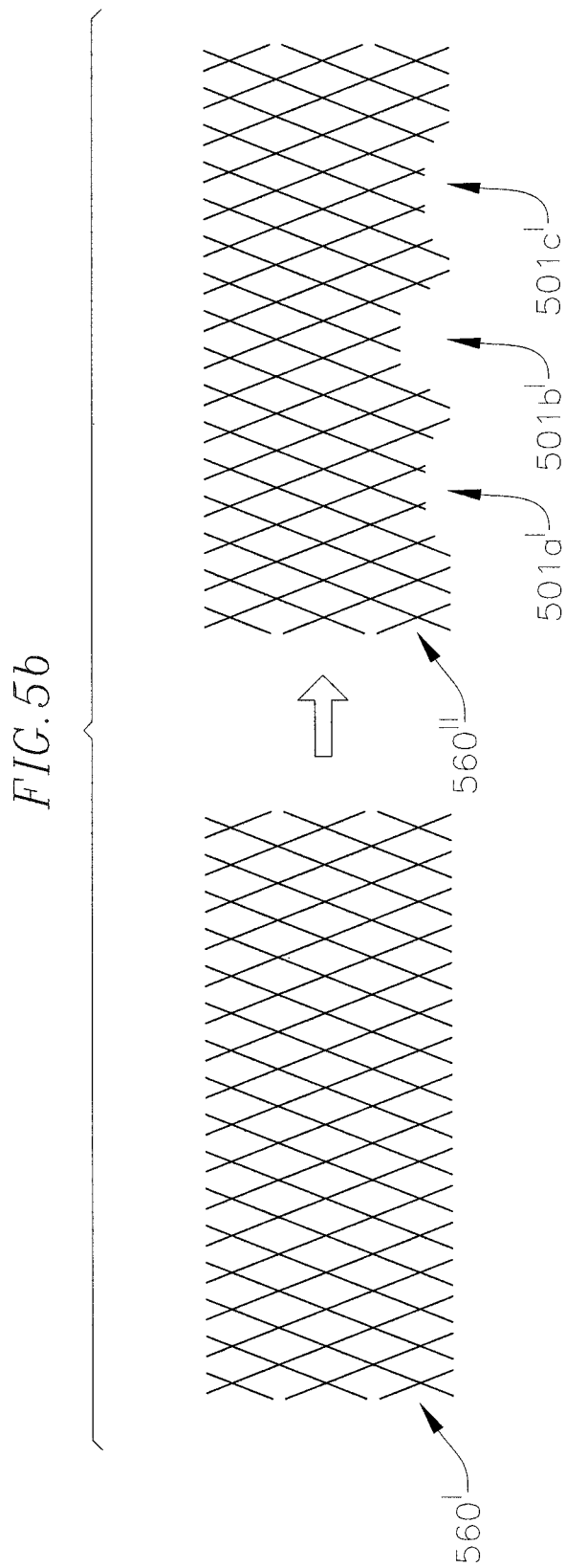

⊘ 3% OF UC HEIGHT
⊘ 7% OF UC HEIGHT
⊕ 11% OF UC HEIGHT

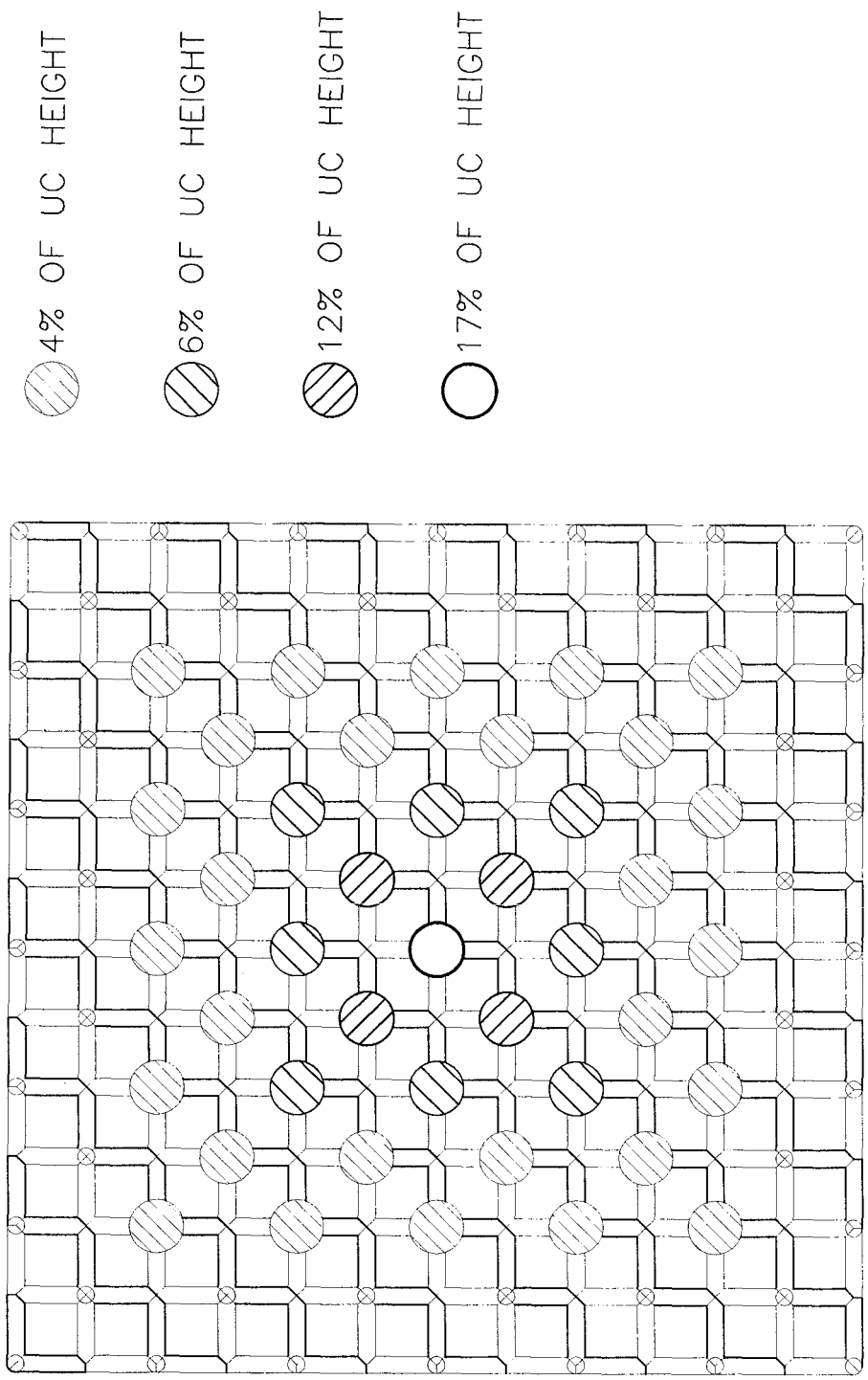

*FIG. 15*
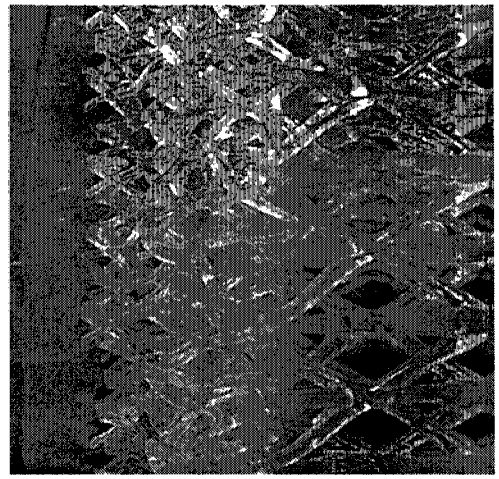
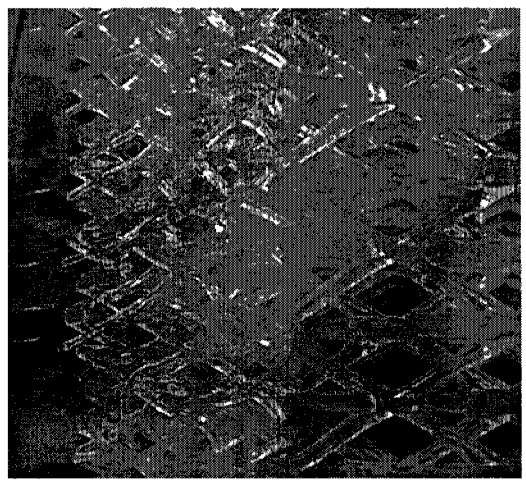
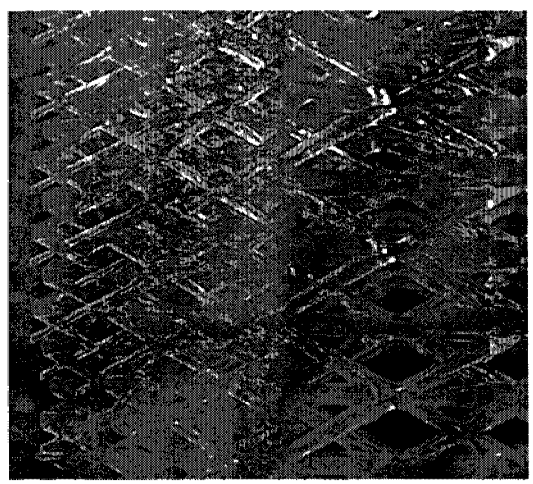

ARCHITECTED MATERIALS FOR ENHANCED ENERGY ABSORPTION

CROSS-REFERENCE TO RELATED APPLICATION(S)

This application is a divisional of U.S. patent application Ser. No. 15/622,518, filed on Jun. 14, 2017, which is a divisional of U.S. patent application Ser. No. 15/151,324, filed on May 10, 2016, now U.S. Pat. No. 9,809,002, issued on Nov. 7, 2017, which is a divisional of Ser. No. 13/927,064, filed on Jun. 25, 2013, now U.S. Pat. No. 9,375,864, issued on Jun. 28, 2016, which claims priority to and the benefit of U.S. Provisional Application No. 61/775,330, filed on Mar. 8, 2013, entitled ARCHITECTED MATERIALS FOR ENHANCED ENERGY ABSORPTION, the contents of all of which are incorporated herein in their entirety by reference.

The use of metallic lattice (truss) materials for energy absorbing application is discussed in U.S. Pat. No. 7,382,959 ("Optically oriented three-dimensional polymer microstructures") and U.S. Pat. No. 8,197,930, issued on Jun. 12, 2012; U.S. Pat. No. 8,320,727, issued on Nov. 27, 2012; U.S. Pat. No. 7,687,132, issued on Mar. 30, 2010; U.S. Pat. No. 7,653,276, issued on Jan. 26, 2010; U.S. Pat. No. 9,116,428, issued on Aug. 25, 2015; and U.S. Pat. No. 8,353,240, issued on Jan. 15, 2013. Various micro-truss structures and methods of manufacturing micro-truss structures are described, in U.S. Pat. No. 9,116,428, issued on Aug. 25, 2015, which discloses a method of fabricating micro-truss structures having a fixed area, U.S. Pat. No. 8,367,306, issued on Feb. 5, 2013, which discloses a method of continuously fabricating micro-truss structures according to a continuous process (e.g., a strip of arbitrary length), and U.S. Pat. No. 8,353,240, issued on Jan. 15, 2013, which discloses a compressible fluid filled micro-truss for energy absorption. Each of the above cross-referenced patents and applications is commonly owned by the assignee of the present application and incorporated by reference herein in their entireties.

FIELD OF THE INVENTION

The following description relates to energy-absorption materials and more particularly to architectured lattice materials with enhanced energy absorption capabilities.

BACKGROUND

Energy absorption materials have been widely used to protect people and goods from damaging impacts and forces. Energy absorption materials can be divided into two categories: those without truss architecture, and those with truss architecture. The former category includes cellular materials such as metallic or polymeric closed or open cell foams, crushed honeycombs, or other commercial materials such as Skydex™. The latter category includes micro-truss structures composed of solid or hollow members (struts, trusses, or lattices) with constant architectural parameters such as unit cell size, radius, length, or angles of each member, through the thickness direction of the structure. For the former category, the cellular materials dissipate kinetic energy associated with impact via elastic and/or inelastic deformation. The compression response of foam and pre-crushed honeycomb materials approaches an ideal response (as shown in FIG. 1, which will be described in more detail afterwards), but the ability of these materials is limited either by the low densification strain in foams or the low load-bearing capability in pre-crushed honeycombs. In either case, although the response characteristics are ideal, the performance of the material suffers due to non-ideal spatial arrangement of the microstructures.

Previous materials with truss or lattice architecture have constant architectural parameters through the thickness direction, i.e., the energy absorbing direction of the truss or lattice structure. The high structural symmetry and lack of disconnected internal members lead to simultaneous buckling and a sharp loss of load transfer capability as shown in FIG. 2. This reduces the energy absorption efficiency of the material as the stress level associated with compaction drops well below the peak value.

Turning now to the behavior of a given energy absorption material during impact or compression, architected materials composed of truss- or beam-like elements experience collapse mechanisms in which the incoming energy or external work is absorbed in three stages: initial buckling, compaction at a constant or near-constant stress plateau, and ultimately full densification. FIG. 1 is a schematic plot illustrating the ideal behavior of an energy absorption material. The initial response of the material is a compressive strain that changes linearly with the compressive stress corresponding to the material response prior to the onset of buckling or plasticity. After reaching a peak stress 101, the ideal material response switches from the linear elastic stage to a constant stress plateau stage 102, where the force transmitted through the material remains uniform and constant, until the material reaches a densification stage in which the strain increases rapidly, linearly or non-linearly, with the stress again. The strain corresponding to the transition point from the plateau stress to the densification stage is identified as the densification strain 103. The maximum possible volumetric energy absoprtion for a given material is calculated as the product of the peak stress 101 with 100% strain. However, actual architected materials will have deviation from the ideal response and lead to a loss of absorption efficiency. FIG. 2 illustrates the typical behavior of a lattice or truss structure with high structural symmetry and internal connectivity. Here, after reaching a peak stress 201 at the onset of buckling, rather than staying at the peak stress level, the compressive stress drops to a lower plateau stress 202. This is believed to be due to the fact that the onset of buckling at a single point in a structure with high structural symmetry and internal connectivity will trigger buckling throughout the structure, which leads to an instantaneous loss of load-carrying capability and reduced energy absorption efficiency. In such a case, the densification strain 203 is defined as the strain level corresponding to the interception of a horizontal line at the peak stress value with the stress-strain curve. The actual volumetric energy absorbed is calculated as the area under the stress-strain curve between 0% strain and the densification strain. The energy absorption efficiency of such a material is calculated as ratio of the actual volumetric energy absorbed to the maximum possible volumetric energy absorption.

Therefore, there is still a demand for lattice architectures with the inherent structural and low mass benefits, yet with improved energy absorption response.

SUMMARY

Aspects of embodiments of the present invention pertain to architected materials with superior energy absorption properties when loaded in compression. The materials possess a truss or lattice configuration with hierarchy through the thickness direction, i.e., the primary energy absorption direction, of the material, which provides enhanced energy absorption functionality versus lattice architectures in prior art while retaining their inherent structural and mass benefits. The added dimension of architectural control can be introduced to a standard lattice structure in two different embodiments.

In one embodiment of the invention, a three-dimensional lattice architecture with a thickness hierarchy includes a first surface and a second surface separated from each other (along a normal direction to at least one of the first and second surfaces) with a distance therebetween defining a thickness of the three-dimensional lattice architecture; a plurality of angled struts extending along a plurality of directions between the first surface and the second surface; a plurality of nodes connecting the plurality of angled struts with one another forming a plurality of unit cells. At least a portion of the plurality of angled struts are internally terminated along the thickness direction of the lattice structure and providing a plurality of internal degrees of freedom towards the first or second surface of the lattice architecture.

In another embodiment of the invention, a three-dimensional lattice architecture with a thickness hierarchy includes a first surface and a second surface separated from each other (along a normal direction to at least one of the first and second surfaces) with a distance therebetween defining a thickness and a thickness direction of the lattice architecture; and a plurality of lattice structures stacking over one another in the thickness direction forming an interface in between, each having a unique set of unit cell parameters. The set of unit cell parameters of two neighboring lattice structures are different from each other.

In one embodiment of the invention, a method of manufacturing a three-dimensional lattice architecture with a thickness hierarchy includes providing a patterned template at at least one of a top and a bottom of a container; providing a volume of photo-monomer in the container contacting the patterned template; exposing the photo-monomer to collimated light through a mask, the collimated light passing through a plurality of apertures of the mask at a non-perpendicular angle with respect to the mask to form a plurality of angled polymer struts in the photo-monomer at the non-perpendicular angle to form the three-dimensional lattice structure.

In another embodiment of the invention, a method of manufacturing a three-dimensional lattice architecture with a thickness hierarchy includes exposing a volume of photo-monomer to collimated light through a mask, the collimated light passing through a plurality of first apertures of the mask at a non-perpendicular angle with respect to the mask to form a plurality of angled polymer struts in the photo-monomer at the non-perpendicular angle to form the three-dimensional lattice structure having a top surface and a bottom surface; and removing a portion of the lattice structure from one of the top surface and the bottom surface.

In yet another embodiment of the invention, a method of manufacturing a three-dimensional lattice architecture with a thickness hierarchy includes providing a first volume of photo-monomer in a first container; exposing the first volume of photo-monomer to collimated light through a first mask, the collimated light passing through a plurality of first apertures of the first mask at a first non-perpendicular angle with respect to the mask to form a first plurality of angled polymer struts in the photo-monomer at the non-perpendicular angle to form a first three-dimensional lattice structure having a first set of unit cell parameters, a first top surface and a first bottom surface; providing a second volume of photo-monomer in a second container; exposing the second volume of photo-monomer to collimated light through a second mask, the collimated light passing through a plurality of second apertures of the second mask at a second non-perpendicular angle with respect to the mask to form forming a second plurality of angled polymer struts in the photo-monomer at the non-perpendicular angle to form a second three-dimensional lattice structure having a second set of unit cell parameters, a second top surface and a second bottom surface; and connecting the first top surface with the second bottom surface. The first set of unit cell parameters and the second set of unit cell parameters are different.

BRIEF DESCRIPTION OF THE DRAWINGS

FIGS. 3a and 3b are schematic drawings illustrating a lattice architecture with architected thickness hierarchy introduced through the use of an architected template.

FIG. 4 is a schematic illustration of a lattice architecture with two different lattice structures stacked together.

FIG. 5a is a schematic drawing illustrating one embodiment of the process of making a lattice architecture using an architected template.

FIG. 5b is a schematic drawing illustrating another embodiment of the process of making a lattice architecture using an architected template.

FIG. 7 shows another exemplary lattice architecture with interrupted internal members.

FIG. 15 shows photographs of the lattice architecture of FIG. 12 composed of two different layers of lattice structures stacking together under compression.

DETAILED DESCRIPTION

Figure 1:
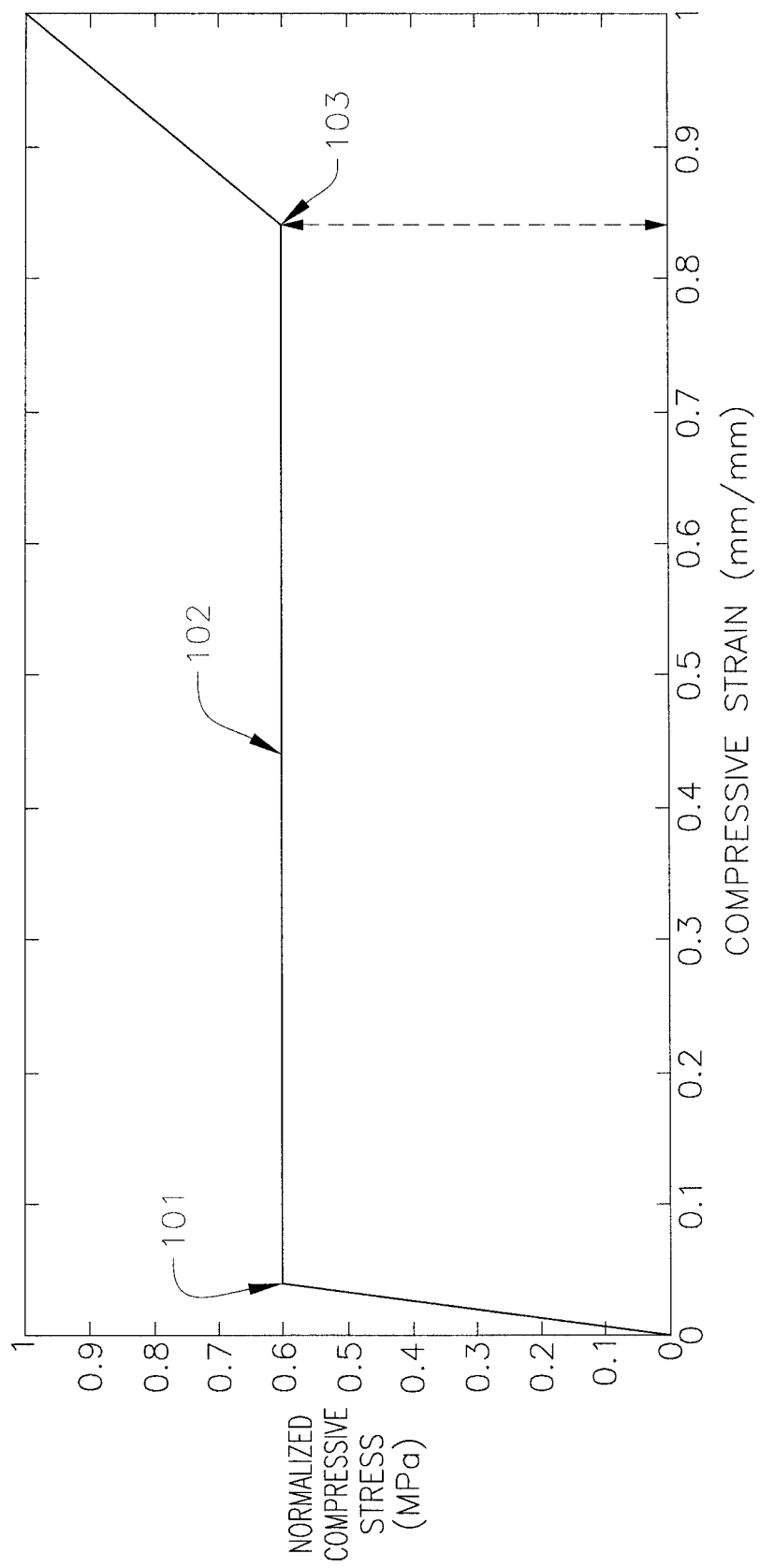
FIG. 1 is a schematic illustration of the ideal compressive stress-strain behavior of an energy absorption material, with or without a lattice architecture.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "on" another element, it can be directly on the another element or be indirectly on the another element with one or more intervening elements interposed therebetween. Like reference numerals designate like elements throughout the specification.

Throughout the disclosure, the terms "internal degree(s) of freedom", "interrupted internal member(s)", "interrupted member(s)", and "internally terminated struts" have been used interchangeably. The terms "member(s)", "strut(s)", and "waveguide(s)" have been used interchangeably. The terms "lattice" and "truss" have been used interchangeably. The term thickness hierarchy indicates that a lattice structure possesses at least two different architectures across the thickness direction of the structure.

First Embodiment of the Invention

Referring to FIG. 3b, a first embodiment of the invention has a three-dimensional lattice architecture with a thickness hierarchy that includes a first surface 311 and a second surface 312 separated from each other (along a direction normal to at least one of the first and second surfaces, e.g., the first surface 311 is parallel to the second surface 312) with a distance therebetween defining a thickness of the three-dimensional lattice architecture, a plurality of angled struts (which may also be referred to as angled "truss elements," "truss members," or "polymer waveguides") 321, 322 extending along a plurality of directions between the first surface and the second surface; a plurality of nodes 330 connecting the plurality of angled struts with one another forming a plurality of unit cells. The angled struts each have a first end 341 and a second end 342. Except in the case of internally terminated struts (discussed in more detail below), each of the first end and the second end contacts with one of the first surface, the second surface, or the sides surrounding the lattice architecture. For example, in a lattice structure with a rectangular cross section, the first end of a strut may be on one of the first surface, the second surface, or one of the four sides surrounding the lattice structure. The second end of the strut will be on one of the rest of the faces determined by the intersection of the strut extending from the first end at a set or predetermined angle with one of the rest of the faces or sides. In this embodiment of the invention, the second surface of the structure has one or more cavities 350, and a portion of the plurality of the angled struts 323 are internally terminated, i.e., terminated in a cavity, along the thickness direction of the lattice structure. Here, the term "internally terminated" refers to those struts that have one of the first end or second end terminated before reaching the first surface, the second surface or one of the sides, i.e., the struts have one of the two ends located inside of the lattice architecture defined by the first and second surfaces and the sides. The term "internally terminated along the thickness direction of the lattice structure" refers to the internally terminated struts which would have reached either the first surface or the second surface if allowed to extend without disruption within the boundaries of the lattice structure. In such a case, a top view of the first surface displays a uniformly patterned two-dimensional lattice structure, while a top view of the second surface displays a disrupted two-dimensional lattice structure with areas missing the lattice elements (the end of the struts). FIG. 3a illustrates the formation of internally terminated struts using a patterned template 301, which has raised steps that result in the cavities in the lattice structure.

Figure 2:
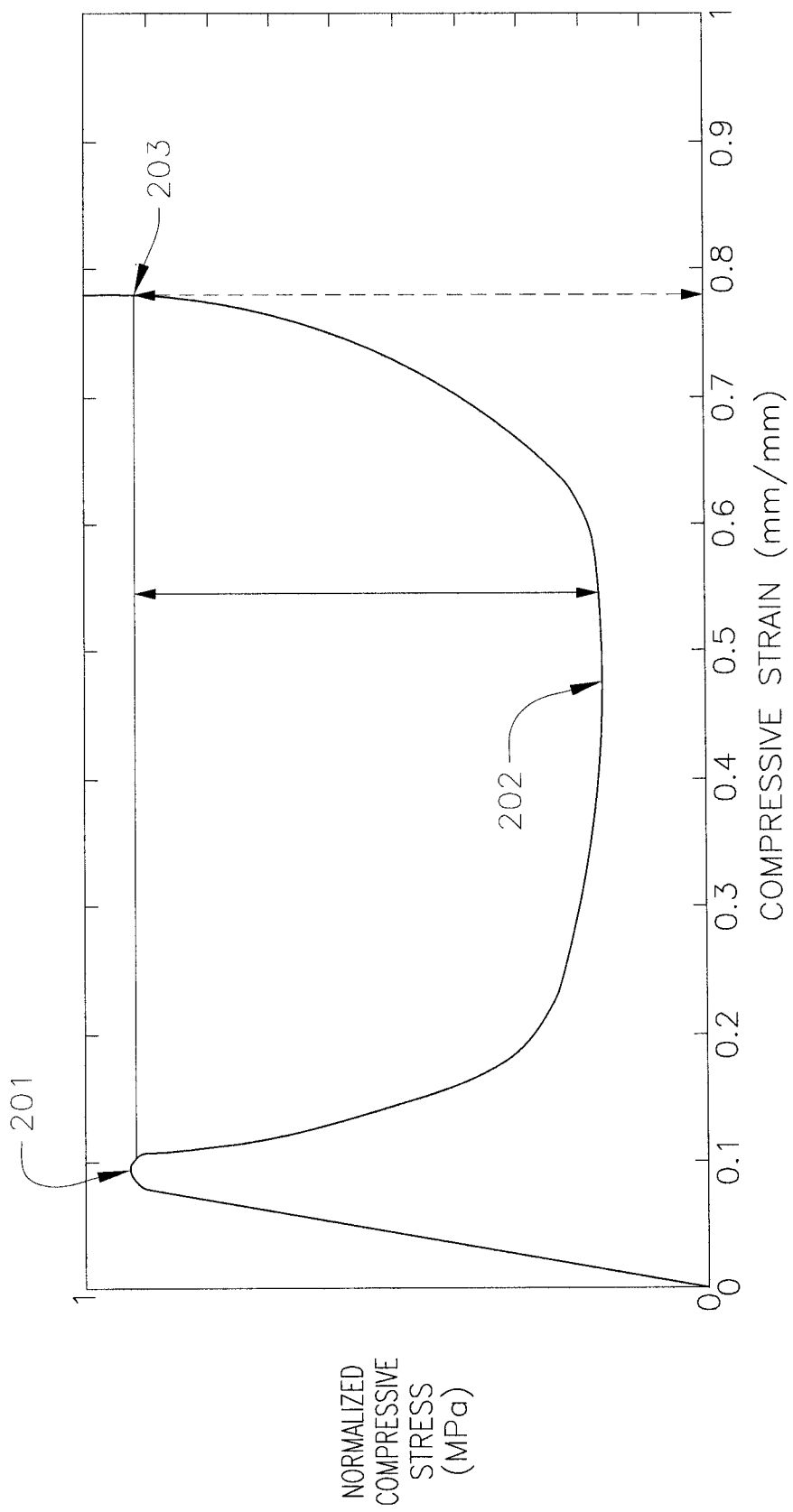
FIG. 2 is a schematic illustration of the typical compressive stress-strain behavior of a lattice or truss structure with high structural symmetry and internal connectivity.

Each internally terminated strut provides an internal degree of freedom to the lattice structure so that when compressed, the internally terminated struts do not transfer load between the first surface and the second surface. Therefore, they do not contribute to the material's initial buckling response until the structure is compressed by a sufficient amount such that the internally terminated struts make contact with the first or second surface. Such staggered buckling response as a result of the introduction of the internally terminated strut blunts the sharp drop in load after the peak stress shown in FIG. 2 (typical behavior for a comparable lattice or truss structure without the internally terminated strut), leading to a response more akin to the ideal response shown in FIG. 1. The energy absorption efficiency can be improved by tailoring the spatial arrangement (i.e., the distribution) and geometric parameters for these internal degrees of freedom. Geometric parameters include size, location in the unit cell structure, geometry of the disrupted area, the thickness or height of the disruption, i.e., the depth of the cavity, or the distance between the end of the internally terminated strut to the surface that it is disrupted from reaching to. The internally terminated strut can be evenly spaced and/or irregularly spaced. The surface area of the missing lattice elements can cover up to about 50% of the surface area of one surface. In one embodiment of the invention, the height of the disruption, i.e., the depth of the cavity, is no more than the height of the periodic unit cell. In another embodiment of the invention, the height of the disruption is from about 0.05 mm to about 25 mm. In yet another embodiment of the invention, the height of the disruption is from a positive value to about 15% of the thickness of the lattice architecture. The height of the disruption can vary across the surface. The length and width of each disrupted area can equal the respective length and width of the repeating periodic unit cell. In one embodiment of the invention, the length and width of each disrupted area is from about 0.1 mm to about 25 mm. In one embodiment of the invention, the energy absorption efficiency can be improved by about 218% by introducing these internal degrees of freedom.

Figure 8:
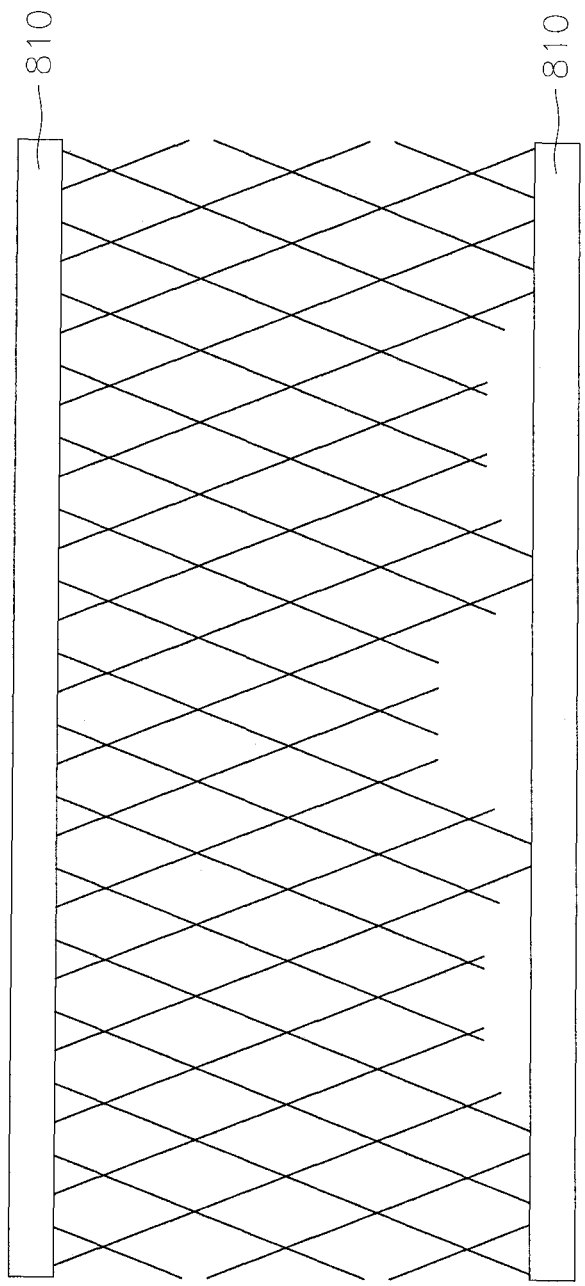
FIG. 8 shows one exemplary lattice architecture with interrupted internal members attached to structural facesheets at the top and bottom surfaces of the structure.

In one embodiment of the invention, no facesheet is bonded to either the first surface or the second surface. In another embodiment of the invention, a facesheet is bonded to either the first surface or the second surface. In another embodiment of the invention, a facesheet 810 is bonded to each of the first surface and the second surface, as shown in FIG. 8. In this case, the struts that are bonded to a facesheet can be referred to as having constrained degrees of freedom, while those terminated internally, and therefore not bonded to any facesheet can be referred to as having internal degrees of freedom. The facesheet material can be made of metallic, polymeric, ceramic or composite materials. The facesheet can be bonded to the lattice structure using adhesives, thermal bonding, solvent bonding, diffusion bonding, welding, brazing, UV flash welding, or any other suitable methods.

The lattice structure can be formed from photopolymer waveguides, produced when a liquid photo-monomer is exposed to collimated ultraviolet light passed through a mask containing ordered apertures. U.S. Pat. Nos. 7,653,279 and 7,382,959 describe such process in detail and are incorporated herein by reference in their entireties. Referring to FIG. 5, one exemplary process of creating lattice architecture with a thickness hierarchy includes first providing a patterned template 510 at either the top or the bottom surface of a container 550. The patterned template 510 is in one embodiment to be made of a non-reflective material, such as an anodized, scuff sanded, or painted aluminum or steel mold. The template 510 can have multiple raised steps 530a, 530b, and 530c over a flat surface 520. Each of the raised steps 530a, 530b, and 530c can have a height, width and length different from the other raised steps, or the same. Since the size, height, and spatial arrangement of the raised features in the template 510 influence shape and the compressive response of the lattice architecture, they provide additional controllable architectural parameters in the design and structural optimization of the lattice architecture. Each of the raised steps 530a, 530b, and 530c can have a height that is from a positive value to about 15% of the thickness of the to be formed lattice structure 560. The total surface area of the raised steps 530a, 530b, and 530c can be up to about 50% of the side area of the side of the lattice structure (or lattice architecture) 560 facing the template 510 (e.g., the side area is referred to a product of a length and a width of the formed lattice structure 560).

Next, photo-monomer 570 can be added to the container 550. The photo-monomer 570 contacts the patterned template 510 and the sides of the container 550. The photo-monomer 570 can then be exposed to collimated light 590 through a mask 580 which has a plurality of apertures at a non-perpendicular angle with respect to the mask to form the lattice architecture formed from the photopolymer waveguides. The collimated light may originate from a plurality of light sources such that there are multiple beams with varying angles to the mask. Or a single light source may be used multiple times and each time at a different angle to the mask to form the lattice architecture. The collimated light 590 can be UV light. The amount of exposure can be controlled so that each waveguide connects from one surface to another surface or one of the sides. Here, the patterned template 510 interrupts the formation of the waveguide from reaching the lower surface on which the patterned template 510 is placed on, which lead to a subset of internally terminated struts, i.e., struts that do not extend fully from the top to the bottom surface. This leads to the formation of a thickness hierarchy in the lattice architecture, and provides internal degrees of freedom to the lattice architecture. The mask 580 and unused photomonomer can then be removed, leaving the solid photo-polymer waveguides as the formed lattice structure 560 in the container 550. The solid-polymer waveguides as the formed lattice structure 560 can then be removed from the container 550 and separated from the patterned template 510. In one embodiment of the invention, a patterned template is provided at each of the top and bottom surface of the container.

In one embodiment of the invention, the solid-polymer waveguide with thickness hierarchy formed using the process described in the previous section can be used as a template for formation of lattice architecture with thickness hierarchy of another material. In such cases, the process further includes a step where the other material is deposited on or formed around the existing structure. Alternatively, the photo-polymer structure may be used to form a mold for reverse casting operations, where the mold forming material first fills around and in between the photo-polymer waveguide. The polymer is subsequently removed prior to casting. Processes such as electro deposition, vapor deposition, sand casting, spray coating, or dip coating can all be used to produce the structure outlined in the the present invention using materials other than the original photopolymer. Such approaches can be used to provide various improvements and enhancements to the lattice structure, such as to enhance chemical or bio-compatibility, to extend the operational service temperature range, to tune the magnitude of the compressive stiffness and plateau stress, to improve aesthetics, to add hydrophobic or hydrophilic properties, and to increase the mechanical durability such as fatigue resistance.

From these aforesaid processes, the struts can be converted into solid metallic, polymeric, ceramic or composite materials. The struts can also be converted into hollow metallic, polymeric, ceramic or composite materials. Examples of suitable metallic materials include magnesium, aluminum, titanium, chromium, iron, cobalt, nickel, copper, zinc or alloys. Examples of suitable polymeric materials include polycarbonate, aramid, high impact polystyrene, nylon, ultra-high molecular weight polyethylene, parylene and combinations thereof.

In another embodiment of the invention, the lattice architecture 560' is produced without the use of any patterned template in the first place, as shown in FIG. 5b. A set or predetermined portions 501a', 501b' and 501c' of the lattice structure are subsequently removed from one of the top surface and the bottom surface to provide a lattice architecture 560'' with the internal degrees of freedom. The lattice structure can be removed through subtractive machining, chemical etching, or laser etching.

In another embodiment of the invention, the lattice structure can be bonded to a facesheet material on one surface or both faces, as shown in FIG. 8. The facesheet material constrains the nodes and the ends of the polymer waveguides on that surface, but cannot provide constraints to those nodes and ends of the polymer waveguides that are terminated internally. In another embodiment of the invention, the lattice architecture does not have a facesheet on one or both of the faces. In this case, the surface without a facesheet has a cross sectional view of nodes or ends of the struts spaced apart and nothing in between.

Figure 6C:
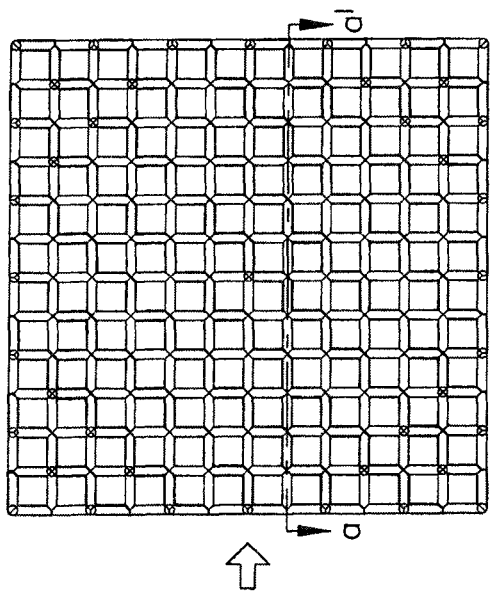
FIG. 6c shows the bottom view of the exemplary lattice architecture shown in FIG. 6a after the introduction of interrupted internal members formed by using the architected template shown in FIG. 6b.
Figure 6D:
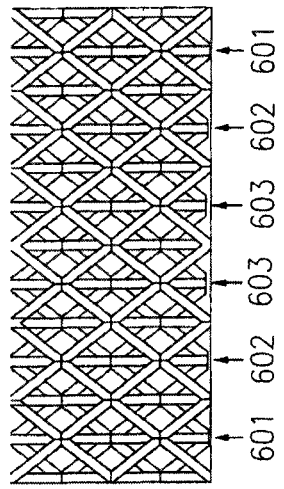
FIG. 6d shows a cross-sectional view of the lattice architecture shown in FIG. 6c along the line a-a'.
Figure 6B:
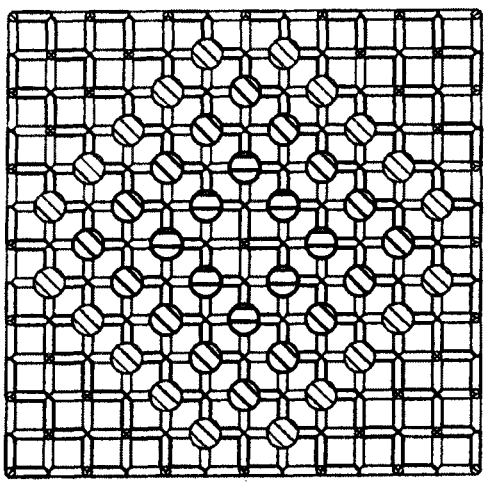
FIG. 6b shows the bottom view of the exemplary lattice architecture shown in FIG. 6a with an architected template superimposed on the lattice architecture.
Figure 6A:
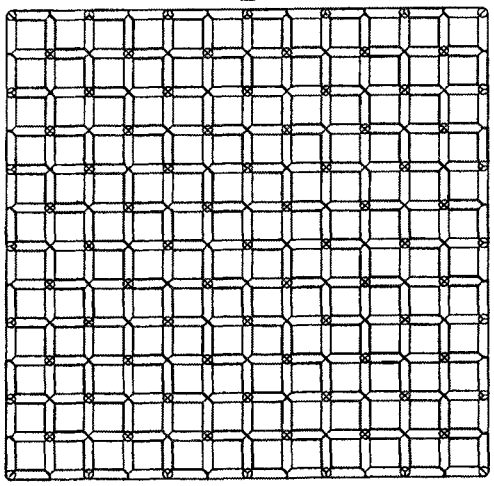
FIG. 6a shows a bottom view of one exemplary lattice architecture prior to the introduction of interrupted internal members.

Referring to FIGS. 6a-6d, an exemplary three-dimensional lattice architecture with a thickness hierarchy has an octahedral architected lattice structure with six periodic unit cells in the length and width of the structure and two periodic unit cells (6×6×2) through the thickness of the structure. FIG. 6a shows a bottom view of the octahedral lattice structure without the introduction of internally terminated struts. The lattice structure has an architected diamond shaped cavity, with a depth increasing in steps towards the center of the cavity, on the bottom surface side. FIG. 6b shows an architected template and the distribution of raised steps at three different heights of 3% of the unit cell height, 7% of the unit cell height, and 11% of the unit cell height, superimposed on the lattice architecture. The raised steps are distributed in three diamond shapes with increasing height from the inner diamond to the outer diamond. FIG. 6c shows a bottom view of the architected lattice structure with internally terminated struts formed by using the architected template. FIG. 6d shows a cross-sectional view along the line a-a' in FIG. 6c. The arrows 601 to 603 point to the location with internally terminated struts with the two outside arrows 601 pointing to the struts terminated at 3% of the unit cell height from the bottom surface (i.e., the portion of the cavity over which the depth is 3% of the unit cell height), the two inner arrows 603 pointing to the struts terminated at 11% of the unit cell height from the bottom surface, and the remaining two arrows 602 pointing to those struts terminated at 7% of the unit cell height from the bottom surface. Here, these percentage values describe certain embodiments of the present invention, but the present invention is not limited by these percentage values.

FIG. 7 illustrates the bottom view of another exemplary three-dimensional octahedral lattice architecture with the same 6×6×2 periodic unit cells and a different thickness hierarchy pattern. In this case, an architected template with raised steps at various heights distributed in square-shapes is used to create the internally terminated strut for the lattice structure. The center of the lattice has a strut internally terminated at 17% of the unit cell height, the four corners of the smallest square surrounding the center point each has a strut terminated at 12% of the unit cell height, the next square surrounding the smallest square has three struts evenly distributed on each side of the four sides that are internally terminated at 6% of the unit cell height. The next two squares moving outward from the center each has four and five internally terminated struts evenly distributed along each side of the square respectively. Both have struts terminated at 4% of the unit cell height.

In both cases illustrated in FIGS. 6 and 7, the periodic arrangement of interrupted members within the lattice acts as an additional degree of symmetry in the material architecture, and can be repeated or tiled in the planar directions to form a larger structure with the same ideal energy absorption response.

Figure 9:
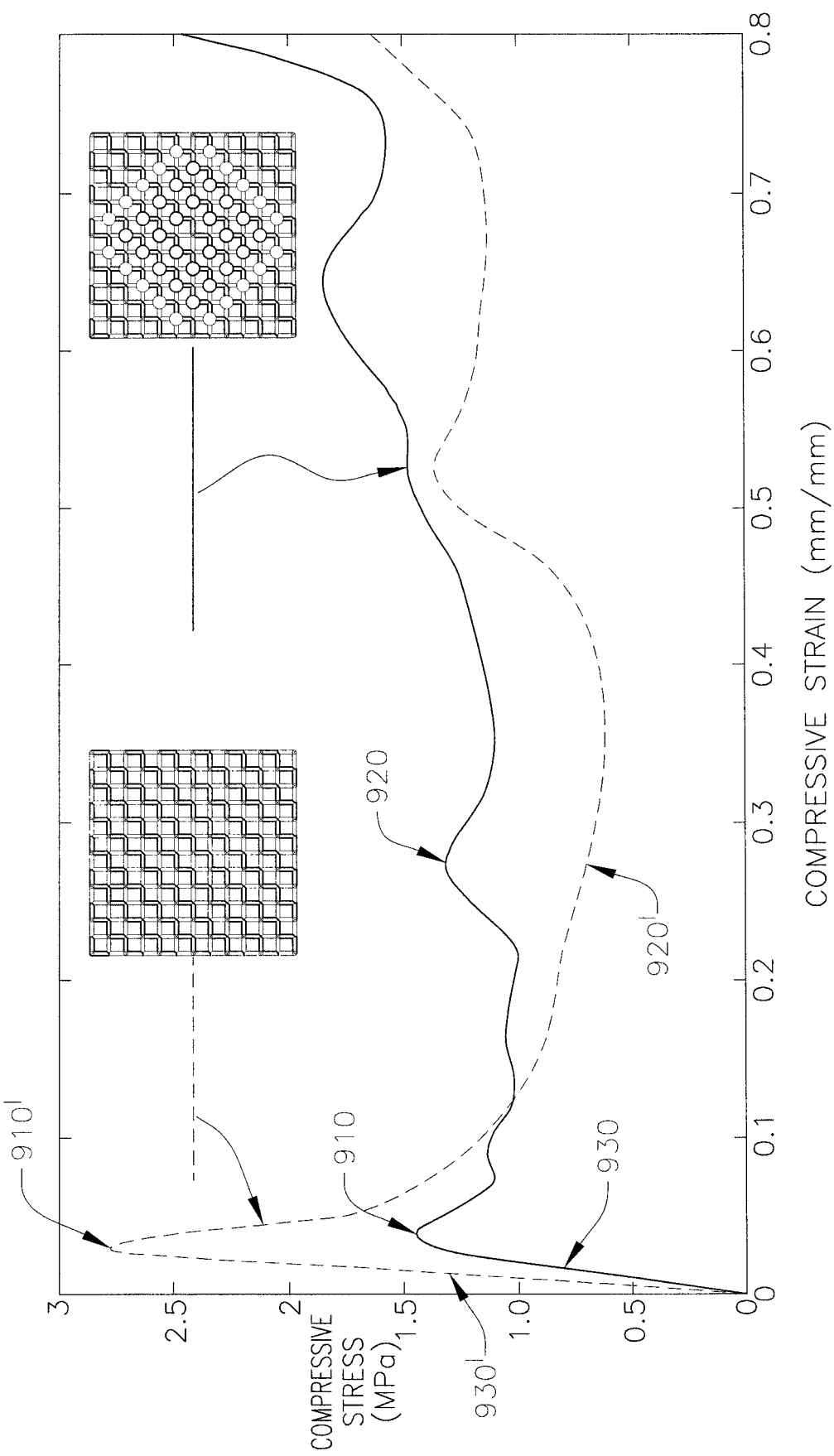
FIG. 9 shows the comparison of a simulated compressive stress-strain response of the exemplary lattice architecture shown in FIG. 7 versus a similar lattice structure without the interrupted members.
Figure 10:
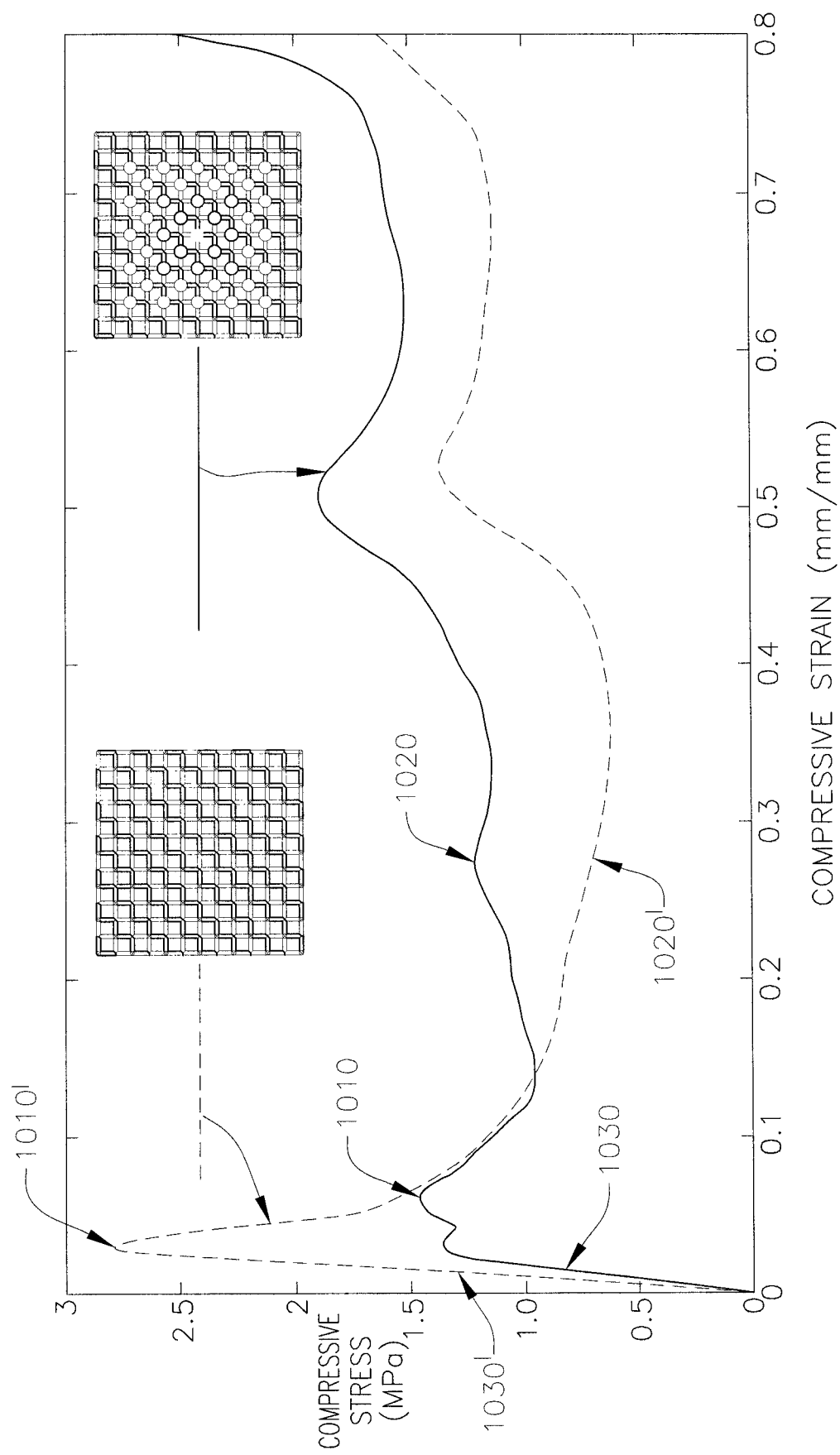
FIG. 10 shows the comparison of a simulated compressive stress-strain response of the exemplary lattice architecture shown in FIG. 8 versus a similar lattice structure without the interrupted members.

The energy absorption efficiencies of both exemplary lattice architectures have been calculated through simulation for a photo-polymer lattice structure, the results of which are shown in FIGS. 9 and 10 respectively. In both cases, although the peak stress (910 and 1010 respectively) and the compressive stiffness (the slope for the initial linear region (930 and 1030 respectively)) are slightly reduced (compared to 910', 1010', 930' and 1030' respectively) due to the loss of connections between the top and bottom faces, both exemplary lattice architectures show a near-constant stress plateau (920 and 1020 respectively) more similar to the ideal response than the same lattice structure without the thickness hierarchy (920' and 1020' respectively). The energy absorption efficiency for each case increases from 25.3% for the lattice structure without the thickness hierarchy to 55% and higher with the thickness hierarchy, more than doubling the efficiency of the lattice structure without the thickness hierarchy. The reduction in the peak stress and compressive stiffness can be compensated for by increasing the member radius, changing the base material, or the angle or orientation with respect to horizontal plane to provide an architectured lattice structure with increased energy absorption energy.

Second Embodiment of the Invention

Referring to FIG. 4, a second embodiment of the present invention with the thickness hierarchy and enhanced energy absorption efficiency utilizes a three-dimensional lattice architecture with a top surface 411 and a bottom surface 412 separated from the top surface (along a normal direction to at least one of the first and second surfaces) defining a thickness and a thickness direction of the lattice architecture; at least two lattice structures 451 and 452 stacked on one another in the thickness direction forming an interface 460 in between, each lattice structure 451 and 452 having a set of unique unit cell parameters and the set of unit cell parameters of two neighboring lattice structures being different from each other such that the lattice parameters at the top and bottom surfaces are distinct. At the interface, at least a portion of the nodes or ends 421 from one lattice structure 451 and the nodes or ends 422 from another lattice structure 452 do not contact each other because of the different unit cell parameters, leading to internal degree of freedom 423 at those points. Such an architected interface where these dissimilar structures connect affects the compressive response of the structure in at least two ways. First, if the node-to-node connections between the neighboring lattice structures are not perfectly matched, as shown in FIG. 4, the free internal ends improve the energy absorption efficiency in a similar manner as the internally terminated struts discussed in the first embodiment of the invention. Second, connection of the neighboring lattice structures at a subset of nodes at the interface creates spatially variant member lengths, radii, and orientations, each of which change the characteristic buckling response of the structure and eliminates the sharp load-drop observed when all members possess the same member length, radius, and orientation.

Figure 11:
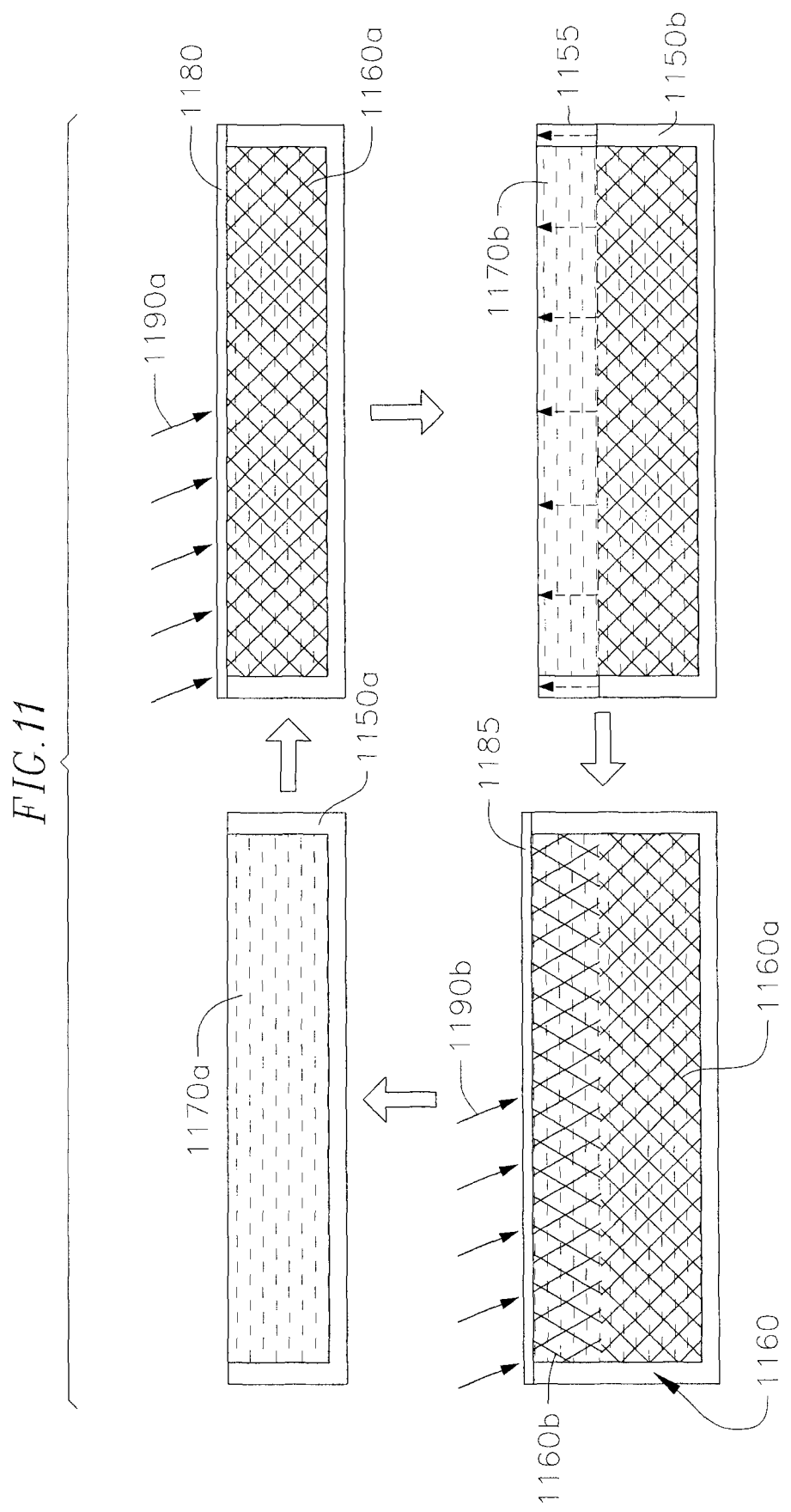
FIG. 11 is a schematic drawing illustrating one embodiment of the process of making a lattice architecture with multiple lattice structures stacked together.
Figure 12:
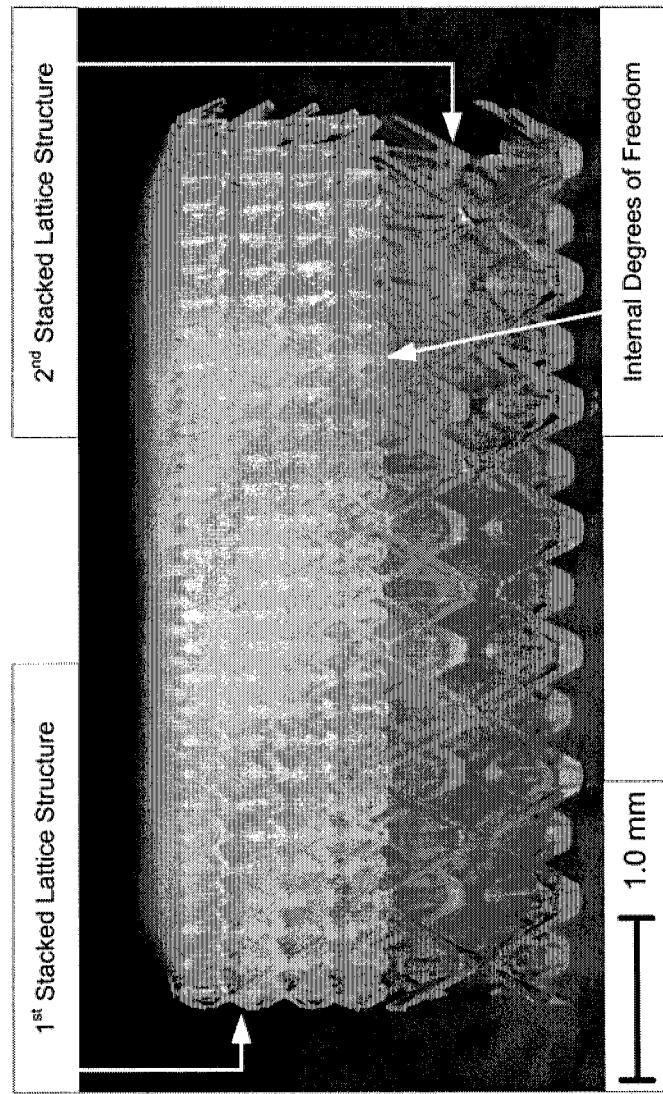
FIG. 12 is a photograph of an actual lattice architecture with two different lattice structures stacked together.
Figure 14:
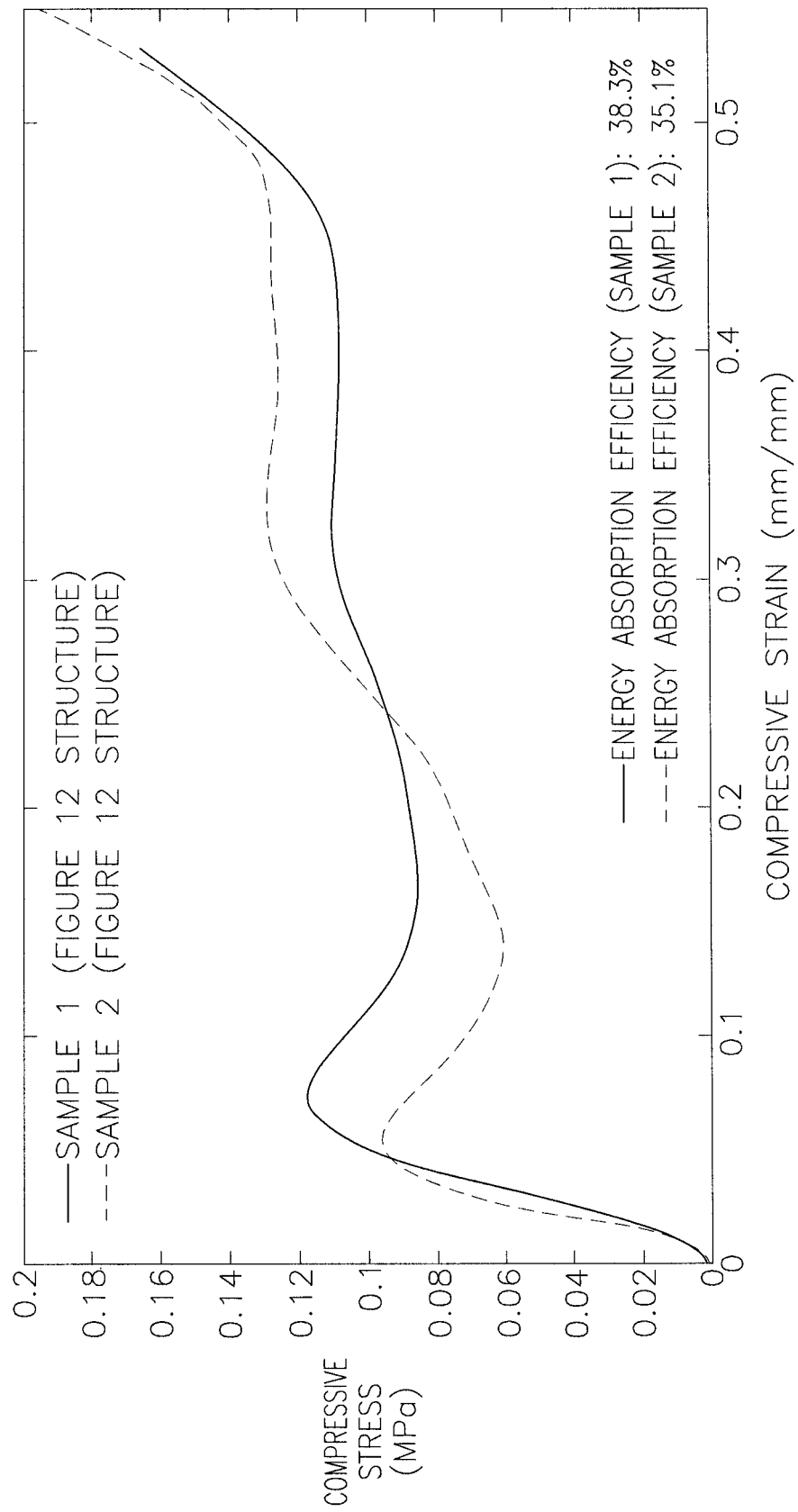
FIG. 14 shows the compressive stress-strain response of the material shown in FIG. 12 under compression.

This embodiment shown in FIG. 11, comprises two or more lattice structures 1160a, 1160b with dissimilar architectural parameters in a stacked manner through the thickness of the structure 1160. A first lattice structure 1160a is formed through the methods disclosed in U.S. Pat. Nos. 7,653,279 and 7,382,959, by providing a first volume of photo-monomer 1170a in a first container 1150a, exposing the first volume of photo-monomer 1170a to collimated light 1190a through a first mask 1180, the collimated light 1190a passing through a plurality of first apertures of the first mask 1180 at a first non-perpendicular angle with respect to the mask 1180 and forming a first plurality of angled polymer struts in the photo-monomer at the non-perpendicular angle to form the three-dimensional first lattice structure 1160a having a first top surface and a first bottom surface. Next, the second lattice structure 1160b can be formed by providing a second volume of photo-monomer 1170b in the same container 1150a by increasing the height of the container 1150a with additional container walls 1155 to form the higher container 1150b (in another embodiment, the same container having the height of the higher container (e.g., the container 1150b) can be utilized to form both the first and second lattice structures); exposing the second volume of photo-monomer 1170b to collimated light 1190b through a second mask 1185, the collimated light 1190b passing through a plurality of second apertures of the second mask 1185 at a second non-perpendicular angle with respect to the mask 1185; and forming a second plurality of angled polymer struts in the photo-monomer at the non-perpendicular angle to form the three-dimensional second lattice structure 1160b with a second top surface and a second bottom surface. The amount of exposure to the collimated light or the volume of the photo-monomer 1170b can be adjusted so that the ends of the second lattice struts are terminated at the first top surface of the three-dimensional lattice first structure 1160a, but do not extend into the three-dimensional first lattice structure 1160a. This process of increasing mold height, adding monomers, applying mask and exposing the monomers to collimated light can be repeated until the desired number of stacked architecture is formed. In addition, this process can be performed using collimated UV light exposure at the bottom surface of the structure in which the resulting lattice with thickness hierarchy is formed from the 'bottom up' as opposed to the 'top down' method of FIG. 11. FIG. 12 shows an optical image of an architecture with two different lattice structures stacked together. The structure of FIG. 12 was formed from solid photo-polymer waveguides using the process of FIG. 11 to produce a 20 mm thick structure composed of two 10 mm thick lattice architectures joined at the thickness-midplane. Each individual lattice structure can be from about 2 mm to about 25 mm thick, as illustrated by FIG. 12 in which two 10 mm thick structures were formed. The energy absorption efficiency of this architecture has been tested using ASTM test method C365 and achieved an energy absorption efficiency of 35.1% and 38.3% for the two samples. FIG. 14 shows the experimental curve for each of the samples. As can be observed, each sample exhibits a response similar to the ideal response shown in FIG. 1. This is a result of the dissimilar interface between the neighboring structures and the internal degrees of freedom resulting from nodes which are not perfectly aligned due to change in the periodic unit cell parameters between the neighboring structures. Further improvement in the densification strain, and thus the overall energy absorption efficiency, can be made through a reduction in relative density, i. e. thinner radii of the struts.

In another embodiment of the invention, the first lattice structure is placed on the surface of the second volume of photo-monomer prior to exposing the second volume of photo-monomer to collimated light to align the ends of both lattice structures at the interface but not extending into the lattice structure of each other.

In another embodiment of the invention, each lattice structure is made separately and joined together with an adhesive, UV flash-weld, welding under pressure at elevated temperature, thermal post-cure, heat bonding, solvent bonding, or other suitable methods.

Figure 13:
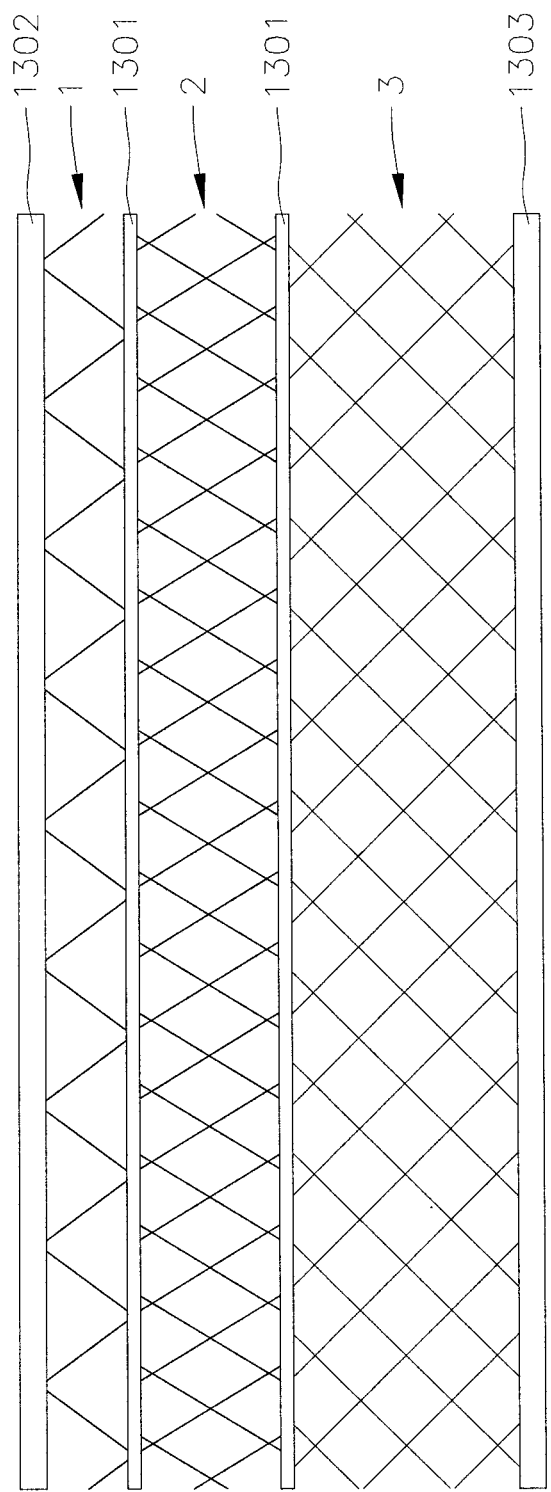
FIG. 13 is a schematic illustration of a lattice architecture with three different lattice structures stacked together including facesheet materials at the interfaces between lattices with dissimilar architectures

In another embodiment of the invention, a facesheet can then be bonded to the top and bottom surfaces of the lattice structure. The facesheet can be made of polymeric, metallic, ceramic, or composite materials. In another embodiment of the invention, the lattice structure is free of any facesheet. In another embodiment of the invention, an interfacial sheet material is placed in-between any two of the lattice structures. FIG. 13 shows such an embodiment, where lattice structures 1, 2 and 3 are stacked with lattice structure 2 sandwiched between lattice structures 1 and 3. Between each of the neighboring lattice structures, a sheet material 1301 is bonded to the lattice surface on both sides. The structure further includes a top facesheet 1302 and a bottom facesheet 1303. Each sheet or facesheet can be bonded to the lattice structure using a suitable bonding method, or bonded in situ during the photo-polymerization proceeded by placing the sheet or facesheet at the interface or surface. It is preferred to have a UV transparent sheet material, such as mylar or a suitable acrylic, when the sheet is placed in between the collimated light source and the liquid monomer.

The materials used for forming each of the lattice structures can be solid or hollow polymeric, metallic, ceramic or composite materials as described previously.

FIG. 15 shows photographs of various stages of deformation of the stacked lattice structure shown in FIG. 12 in a compression test. The top lattice structure with a smaller unit cell size can be observed to buckle under the load, and the unsupported nodes were pushed into the pores of the lower structure. In this instance, the structure with the lowest buckling resistance (the smaller unit cell lattice) is placed closest to the initial impact (i.e. farthest from the structure to be protected). Under the quasi-static compression conditions of ASTM C365, the structure is insensitive to the stacking order of the individual lattices. However, under high rate dynamic conditions, the ordering of the lattice structures through the thickness will impact the energy absorption response of the structure due to inertial stabilization effects. Under these conditions, it is preferable to place the structures with the lowest buckling resistance farthest from the structure to be protected, as in FIG. 15, such that the resultant structure experiences a staggered buckling response from the outer (impacted) surface towards the inner (protected) surface.

An ordered three-dimensional architected material (architecture) in one or more embodiments of the present invention is an ordered three-dimensional structure at the millimeter to centimeter scale (e.g., from 0.1 mm to 10 cm). However, in some embodiments, the ordered three-dimensional structure can be down to the micrometer scale.

Although limited embodiments of architected materials (architectures) for enhanced energy absorption have been specifically described and illustrated herein, many modifications and variations will be apparent to those skilled in the art. Accordingly, it is to be understood that the materials (architectures) constructed according to principles of this invention may be embodied other than as specifically described herein. The invention is also defined in the following claims, and equivalents thereof.

What is claimed is:

1. A method of manufacturing a three-dimensional lattice structure with a thickness hierarchy, the method comprising:
   exposing a volume of photo-monomer to collimated light through a mask, the collimated light passing through a plurality of first apertures of the mask at a non-perpendicular angle with respect to the mask to form a plurality of angled polymer struts in the photo-monomer at the non-perpendicular angle to form the three-dimensional lattice structure having a top surface and a bottom surface; and
   removing a portion of the three-dimensional lattice structure from one of the top surface and the bottom surface to create the thickness hierarchy.

2. The method of claim 1, wherein the removing of the portion of the lattice structure is performed through subtractive machining, chemical etching, laser etching, or combinations thereof.

3. The method of claim 1, further comprising bonding a facesheet to the top surface and/or the bottom surface.

4. The method of claim 3, wherein the facesheet comprises a material selected from the group consisting of metallic materials, polymeric materials, ceramic materials and composite materials.

5. The method of claim 3, wherein the bonding of the facesheet is performed utilizing adhesives, thermal bonding, solvent bonding, diffusion bonding, welding, brazing, or UV flash welding.

6. The method of claim 1, further comprising:
   depositing a second material over the three-dimensional lattice structure to form a composite lattice structure;
   wherein the second material is different from the polymer in the angled polymer struts.

7. The method of claim 6, further comprising:
   removing the polymer from the composite lattice structure.

8. The method of claim 6, wherein the second material is selected from the group consisting of metallic, polymeric, ceramic and composite materials.

* * * * *